Sept. 29, 1964

J. W. PHILLIPS 3,150,675

AVERAGING RELAY

Filed Aug. 29, 1962

INVENTOR
James W. Phillips

BY *Herbert M Birch*
ATTORNEY

Sept. 29, 1964  J. W. PHILLIPS  3,150,675
AVERAGING RELAY
Filed Aug. 29, 1962  8 Sheets-Sheet 4

INVENTOR
James W. Phillips

BY *Herbert M. Birch*
ATTORNEY

Sept. 29, 1964   J. W. PHILLIPS   3,150,675
AVERAGING RELAY

Filed Aug. 29, 1962   8 Sheets-Sheet 5

INVENTOR
James W. Phillips

BY Herbert M. Birch
ATTORNEY

Sept. 29, 1964   J. W. PHILLIPS   3,150,675
AVERAGING RELAY

Filed Aug. 29, 1962   8 Sheets-Sheet 6

INVENTOR
James W. Phillips
BY *Herbert M. Birch*
ATTORNEY

Sept. 29, 1964 J. W. PHILLIPS 3,150,675
AVERAGING RELAY
Filed Aug. 29, 1962 8 Sheets-Sheet 7

INVENTOR
James W. Phillips
BY
ATTORNEY

Sept. 29, 1964　　　　　J. W. PHILLIPS　　　　　3,150,675
AVERAGING RELAY

Filed Aug. 29, 1962　　　　　　　　　　　　8 Sheets-Sheet 8

INVENTOR
James W. Phillips

BY *Herbert M. Birch*
ATTORNEY 3,150,675
AVERAGING RELAY
James W. Phillips, 3712 Brentwood Drive,
South Bend, Ind.
Filed Aug. 29, 1962, Ser. No. 220,307
8 Claims. (Cl. 137—85)

This invention relates to pressure operated relays and more particularly to pneumatic averaging relays wherein the pressure output thereof is a function of the average of a plurality of pressure inputs.

It is an object of this invention to provide a pressure averaging relay for providing a pressure output as a function of the average of a plurality of pressure inputs.

Another object of this invention is to provide a pressure averaging relay for providing a pressure output as a function of the average of a plurality of pressure inputs, wherein a plurality of like interchangeable parts may be utilized to construct such a relay for a predetermined plurality of pressure inputs.

Still another object of this invention is to provide a pressure averaging relay for providing a pressure output as a function of the average of a plurality of pressure inputs, said relay including biasing means whereby the operating level of the pressure output with respect to the said average of the plurality of pressure inputs may be selectively varied.

These and other objects of the invention will become apparent with reference to the following specification and drawings which relate to a preferred embodiment of the invention.

Figure 1:
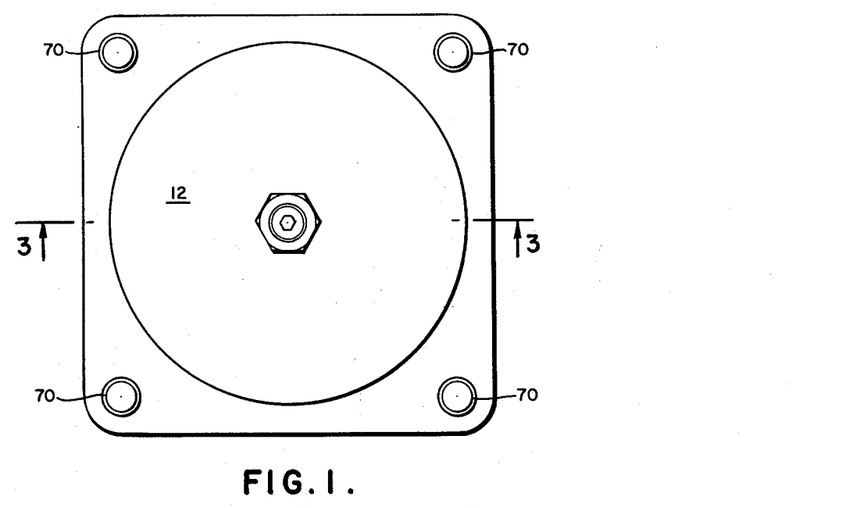
FIGURE 1 is a top end view of the invention.
Figure 2:
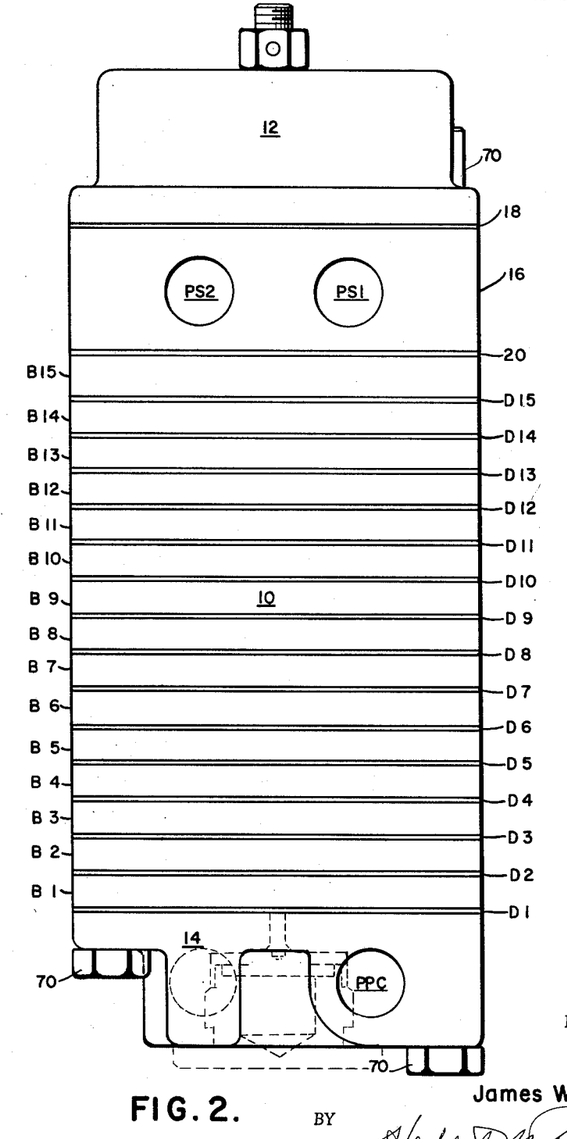
FIGURE 2 is a side elevation of the invention.

Referring in detail to the drawings and more particularly to FIGURES 1 and 2, the averaging relay of the present invention is shown as including an elongated main body portion 10 having end caps 12 and 14, respectively, at the top and bottom thereof.

Figure 3:
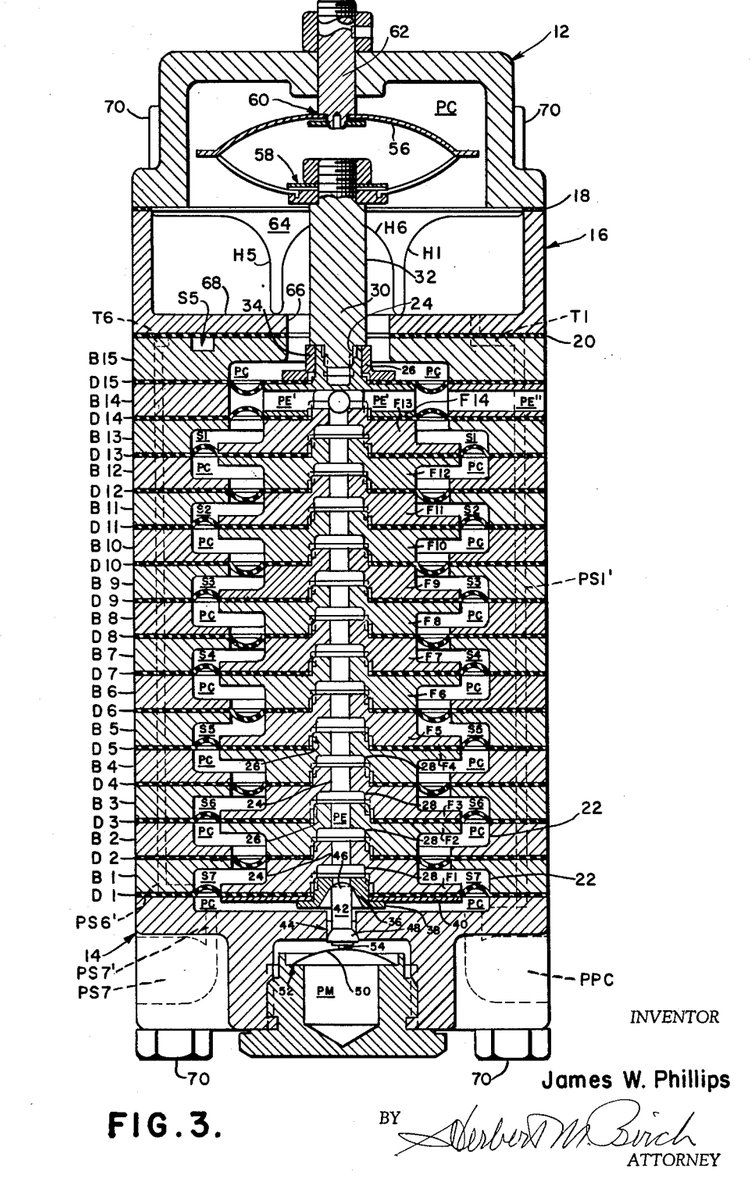
FIGURE 3 is a side elevation of the invention, in cross-section, taken along line 3—3 of FIGURE 1.

The elongated main body portion 10, referring now to FIGURES 2 and 3, is of a stacked construction comprising a plurality of diaphragms D1–D15 and alternately interposed pressure plates B1–B15 extending from the bottom end cap 14 upward. A multiple input casing section 16 is located between the top end cap 12 and the uppermost pressure plate B15 and is separated therefrom by an upper sealing gasket 18 and a lower signal pressure coupling gasket 20.

The pressure plates B1–B15 are counterbored at their centers resulting in centrally disposed bores 22 which show up in FIGURE 3 as a stepped cross-section. To avoid undue multiplicity of numerals, only those counterbores 22 in pressure plates B1 and B2 will be labelled. It can now be seen that those pressure plates B which bear odd subscripts are disposed such that their counterbored surfaces are facing downward, while those pressure plates B which bear even subscripts are disposed such that their counterbored surfaces are facing upward.

The alternate or complementary arrangement of the counterbores 22 in the pressure plates B1–B15 and the alternate stacked arrangement of these plates with the diaphragms D1–D15, respectively, separating adjacent pressure plates, results in a plurality of signal pressure chambers S1–S7, alternate with a plurality of control pressure chambers PC between adjacent diaphragms D1–D15, a control pressure chamber PC between the lowermost diaphragm D1 and the bottom end cap 14 and another control pressure chamber PC between the uppermost diaphragm D15 and the top end cap 12.

The diaphragms D1–D15 are separated one from another by a plurality of diaphragm buttons F1–F14, the said diaphragms having central bores 24 located in upstanding, reduced, hollow cylindrical portions or necks 26 of the said diaphragm buttons, as indicated only on the buttons F1, F2 and F3 to avoid multiplicity. Each of the necks 26 of the diaphragm buttons F1–F14 are counterbored from the lower end thereof such that a socket 28, indicated on diaphragm buttons F2 and F3, is provided whereby adjacent diaphragm buttons F may be interconnected, the counterbored necks 26 thereof forming part of an exhaust pressure chamber PE.

The upper diaphragm button F14 is provided with a multiplicity of radial ports PE interconnected with the center bore 24 in the next lowest button F13 whereby the exhaust pressure chamber PE is permitted to extend into the space between the upper diaphragms D14 and D15 separated by the pressure plate B14. The exhaust pressure is vented to atmosphere via a port PE″ extending horizontally through the outer periphery of the pressure plate B14.

Those diaphragm buttons F bearing odd subscripts have radially stepped upper surfaces while those bearing even subscripts have radially stepped lower surfaces, the complementary stepping of alternate diaphragm buttons F1–F14 being alternately opposite, respectively, to the radially stepped upper and lower surfaces of the pressure plates B1–B15. Thus, the signal pressure chambers S1–S7 and the control pressure chamber PC located between adjacent diaphragms are also partly defined by the pressure plates B1–B15 on two sides thereof and the diaphragm buttons F1–F14 on the opposite two sides thereof.

Those pressure plates B bearing odd subscripts comprise upper wall portions of the signal pressure chambers S1–S7 while those bearing even subscripts comprise lower wall portions of those control pressure chambers PC between the diaphragms D1–D15. Those diaphragm buttons F bearing odd subscripts form lower wall portions of the signal pressure chambers S1–S7 while those bearing even subscripts form upper wall portions of those control pressure chambers PC between the diaphragms D1–D15.

The stack of interconnected diaphragm buttons F1–F14 comprise a reciprocable valve spindle 30 having an upper axial extension in the form of a shaft 32 threaded into the bore 24 in the neck portion 26 of the upper diaphragm button F14. A hold-down collar 34 is threaded onto the externally threaded neck 24 of the uppermost diaphragm button F14 whereby the uppermost diaphragm D15 is secured to the said diaphragm button. The spindle 30 is completed at its lower end by a centrally and frustoconically bored valve seat 36 having a lower radially flanged end 38, the said valve seat 36 being fixed in the counterbore 28 of the lowermost diaphragm button F1. A hold-down plate 40 coextensive with the lower surface of the said lowermost diaphragm button F1 and the lowermost diaphragm D1 are both held securely against the said lower surface of the lowermost button F1 by means of the radially flanged lower end 38 of the valve seat 36.

Figure 10:
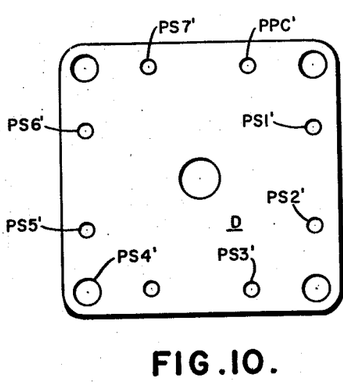
Figure 28:
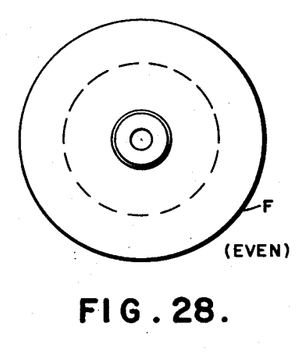
Figure 29:
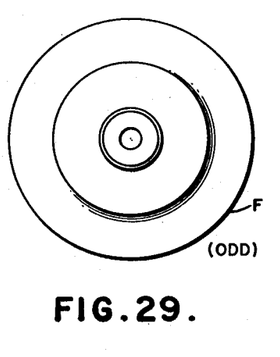

The pressure plates B1–B15 are shown, respectively, in top plan view in FIGURES 11 through 25; the diaphragms D are shown in top plan view in FIGURE 10; and the diaphragm buttons F are shown in top plan view in FIGURES 28 and 29.

A two-way poppet type relay control valve, 42, located in vertical alignment with the valve seat 36 in the spindle 30, is reciprocably mounted in an integral fixed valve seat and control port 44 in the bottom end cap 14, connecting the main pressure chamber PM with the lowermost control pressure chamber PC.

The upper end 46 of the valve 42 is generally spherical to cooperate with the frusto-conical valve seat 36 while the lower end 48 thereof is substantially of a conventional poppet shape, the said lower end 48 being located inside the main pressure chamber PM.

A spider spring 50 mounted on a supporting shoulder 52 in the main pressure chamber PM and bowed upward into contact with a lower bearing tip 54 on the poppet valve 42 is provided to normally maintain the said valve 42 in such a position as to normally close the control port 44.

Acting in the opposite direction from the spring 50 in order to normally bias the spindle 30 and hence, the valve seat 36 downward to close off the lowermost control pressure chamber PC from the exhaust pressure chamber PE by forcing the said valve seat 36 against the upper end 46 of the poppet valve 42, is a second spider spring 56. The said second spider spring 56 is mounted between a seat 58 on the upper tip of the axial shaft 32 on the spindle 30 and a seat 60 on the lower tip of a stud 62 extending through and secured to the top of the top end cap 12.

In order to couple the signal pressures S1–S7 to the averaging relay, the signal pressures S1–S6 are connected into the multiple input casing 16 via input ports PS1–PS6, partially shown in FIGURE 2, while the signal pressure S7 is connected into the bottom end cap 14 via an input port PS7.

Also in the bottom end cap 14 are located the main pressure input port PPM and the control pressure output port PPC, the latter comprising the output port of the averaging relay of the invention.

Referring jointly to FIGURES 2, 3, 4, 5, 6, 7, and 8, the multiple input casing 16 will now be described in detail.

Figure 4:
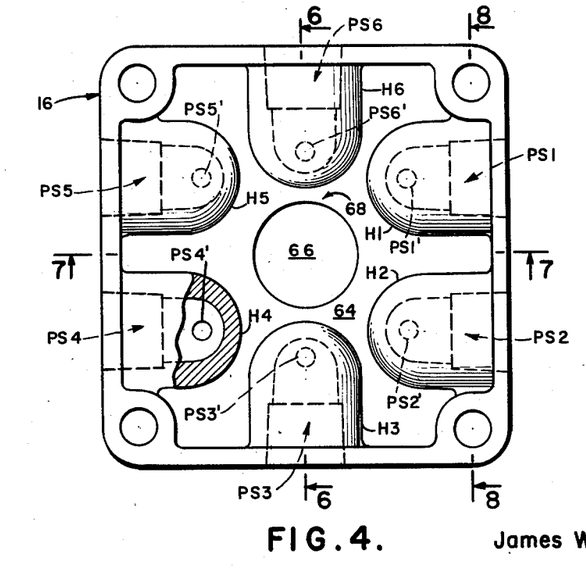
FIGURE 4 is a top plan view of a component of the invention.

As shown in FIGURE 4, the inlet ports PS1–PS6 are symmetrically disposed about the periphery of the input casing 16 and extend inwardly thereof in the form of domed individual port housings H1–H6, respectively, which creates a generally star-shaped central cavity 64 within the input casing 16 which is adapted to be closed at the top by the top end cap 12 and connected via a reduced diameter port 66 in the lower wall 68 thereof as an integral part of the uppermost control pressure chamber PC. The reduced-diameter port 66 also serves as a through-port for the axial shaft extension 32 of the spindle 30. Various cross-sections through the input casing 16 are shown by FIGURES 5, 6, 7 and 8 to fully clarify the structure thereof. These figures bear like numerals for like parts to FIGURE 4.

Figure 5:
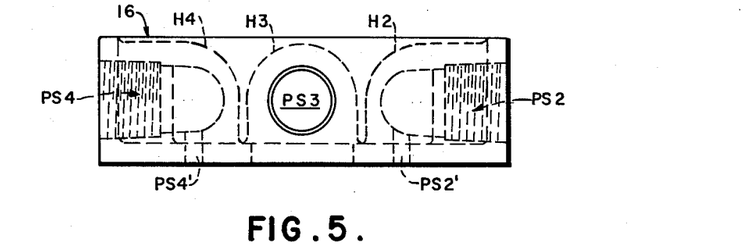
FIGURE 5 is a side elevation of the component of FIGURE 4.
Figure 6:
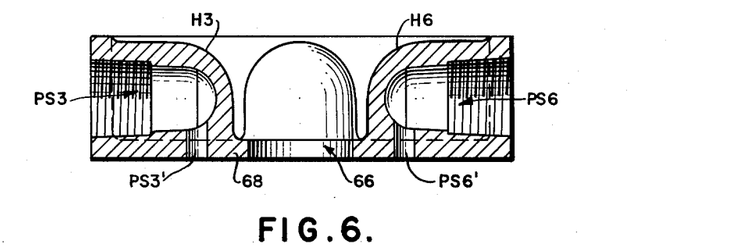
FIGURE 6 is a cross-section taken along line 6—6 of FIGURE 4.
Figure 7:
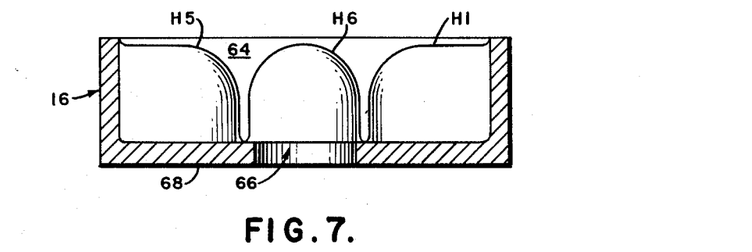
FIGURE 7 is a cross-section taken along line 7—7 of FIGURE 4.
Figure 8:
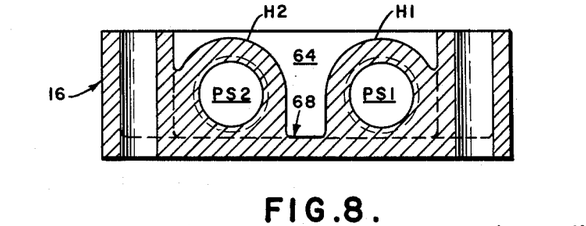
FIGURE 8 is a cross-section taken along line 8—8 of FIGURE 4.

As best shown in FIGURES 4, 5 and 6, the inlet ports PS1–PS6, at their innermost ends, each contain reduced diameter pressure transmitting ports PS1′–PS6′, respectively, extending down through the web 68 of the input casing 16.

Referring now to FIGURES 9 through 29, the porting of all of the various signal pressures S1–S7 through all of the various components will now be described.

Figure 9:
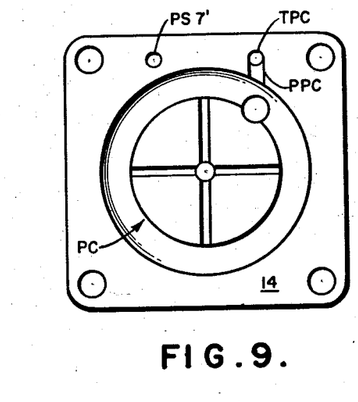
FIGURES 9 through 29, inclusive, each comprise a top plan view in schematic form of a detail of FIGURE 3, the format of this series of figures being such that all of the said details are in proper relative orientation for assembly.

As shown in FIGURE 9 (also in FIGURE 3) a pressure transmitting port PS7′ comprising an extension of the inlet port PS7 for the pressure signal S7 is provided vertically in the bottom end cap 14 along with a vertical extension of the output port PPC for the control pressure PC as shown. Additionally, a control pressure transfer channel TPC is disposed in the upper face of the bottom end cap 14 extending from the pressure chamber PC, shown in top plan view as toroidal in shape, to the base of a control pressure transfer port PPC′.

Referring now to FIGURE 10, the diaphragms D are all shown to be identical squares including a pair of pressure transfer ports along each side thereof. One transfer port is provided for each of the pressure signals S1–S7 and the control pressure PC, namely PS1′–PS7′ and PPC′, respectively. Every one of the pressure plates B1–B15 also include extensions of the transfer ports PS1′–PS7′ and PPC′ as shown on the pressure plate B1 in FIGURE 11. Thus, every part in the stacked body assembly comprising the diaphragms D1–D15 and pressure plates B1–B15 carries every pressure in the relay via the transmitting ports PS1′–PS7′ and PPC′ which are in registry through every one of said parts.

The diaphragms D and the pressure plates B are alternately interpositioned in stacked form on the bottom end cap 14 in the numerical order of FIGURES 9 through 25 with the diaphragms separated at their centers by corresponding alternately disposed diaphragm buttons F as shown in FIGURES 28 and 29, the entire assembly being shown in cross-section in FIGURE 3 as already described herein.

Figure 11:
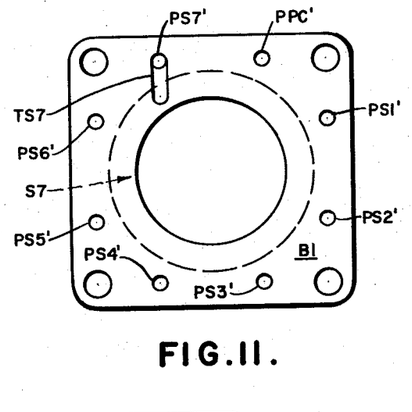
Figure 12:
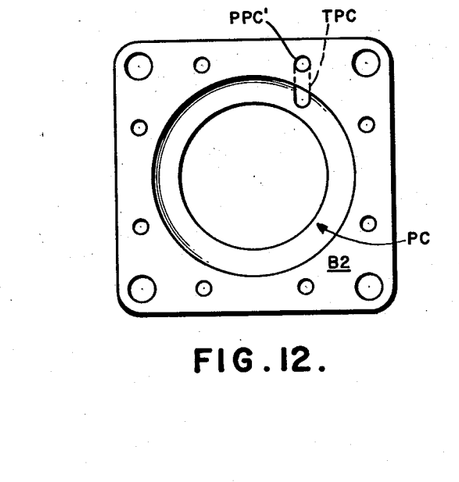

Following this structure from the bottom end cap 14 upward, through FIGURES 10 and 11 already described, the remaining figures show the following:

The pressure plate B2 is shown in FIGURE 12 as including a control pressure transfer channel TPC leading from the control pressure transfer port PPC′ into the control pressure chamber PC therein.

Figure 13:
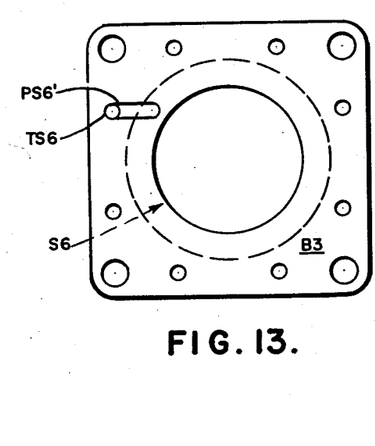

The pressure plate B3 is shown in FIGURE 13 as including a pressure transfer channel TS6 leading from signal pressure transfer port PS6′ to the signal pressure chamber S6 therein.

Figure 14:
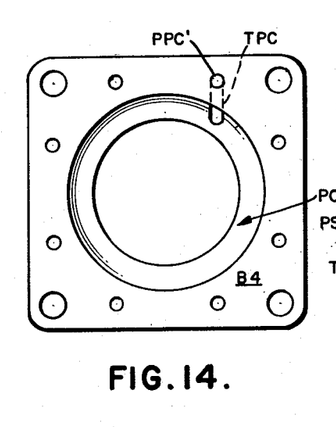

The pressure plate B4 is shown in FIGURE 14 as including a pressure transfer channel TPC leading from the control pressure transfer port PPC′ into the control pressure chamber PC therein.

Figure 15:
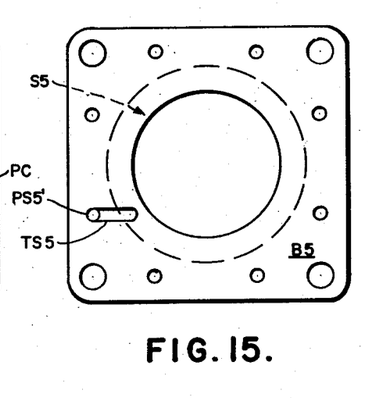

The pressure plate B5 is shown in FIGURE 15 as including a pressure transfer channel TS5 leading from signal pressure transfer port PS5′ to the signal pressure chamber S5 therein.

Figure 16:
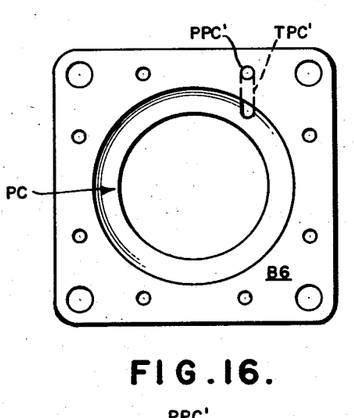

The pressure plate B6 is shown in FIGURE 16 as including a pressure transfer channel TPC leading from the control pressure transfer port PPC′ to the control pressure chamber PC therein.

Figure 17:
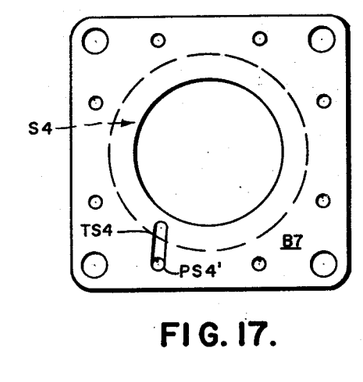

The pressure plate B7 is shown in FIGURE 17 as including a pressure transfer channel TS4 leading from signal pressure transfer port PS4′ to the signal pressure chamber S4 therein.

Figure 18:
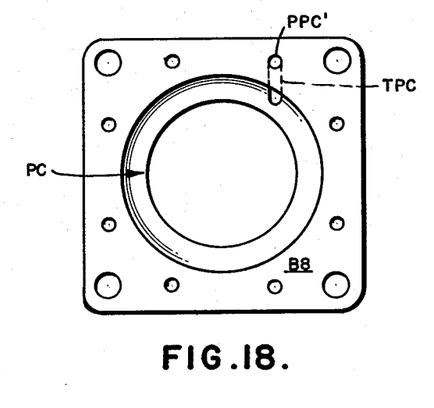
Figure 20:
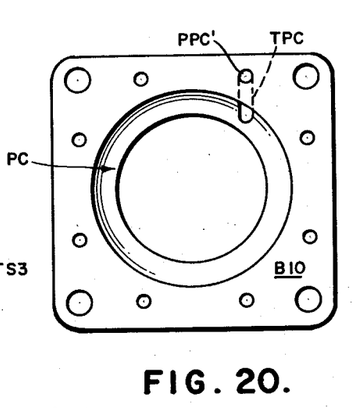
Figure 22:
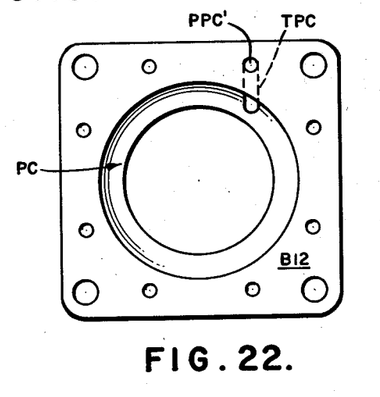

As indicated by the six (6) foregoing paragraphs an alternate channeling and porting of control pressures and signal pressures into the pressure chambers in the body portion 10 of the averaging relay of the invention is provided. This channeling and porting is completed as follows:

Pressure plates B8, B10 and B12, as shown in FIGURES 18, 20 and 22, respectively, each include a pressure transfer channel TPC extending from the control pressure transfer port PPC′ into the control pressure chamber PC therein.

Figure 19:
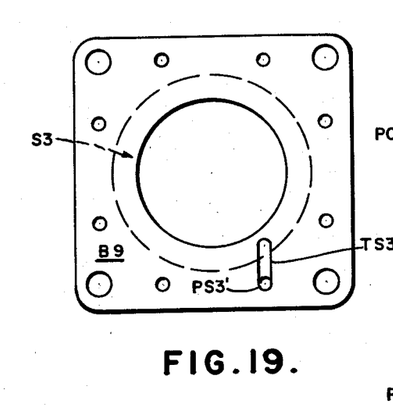
Figure 21:
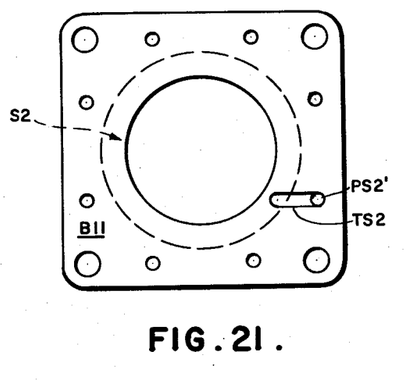
Figure 23:
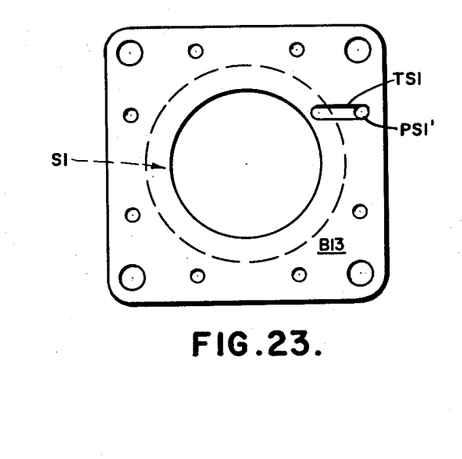

Pressure plates B9, B11 and B13, as shown in FIGURES 19, 21 and 23, respectively, are provided, respectively, with pressure transfer channels TS3, TS2 and TS1 leading from the respective signal pressure transfer ports PS3′, PS2′ and PS1′ into the respective signal pressure chambers S3, S2 and S1 therein.

Figure 24:
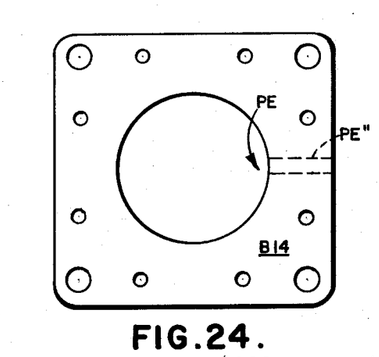
Figure 25:
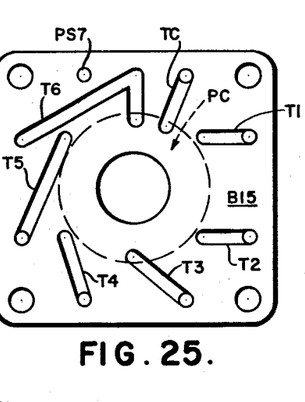

The pressure plate B14 is shown in FIGURE 24 to illustrate further the position of the exhaust pressure outlet port PE″ extending from the exhaust pressure chamber PE to the atmosphere.

Referring now to FIGURES 4, 25, 26 and 27, the multiple input casing 16, with its symmetrically disposed signal pressure inlet ports PS1–PS6 is separated from the pressure plate B14 by a diaphragm D15 (FIGURE 3) the pressure transfer plate B15 and the signal pressure coupling gasket 20 between the transfer plate B15 and the input casing 16.

Figure 26:
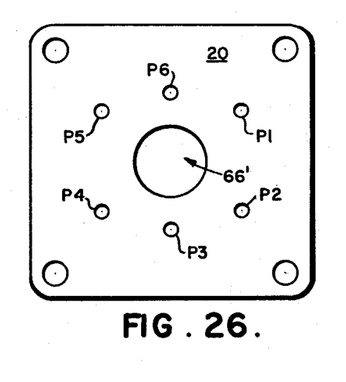
Figure 27:
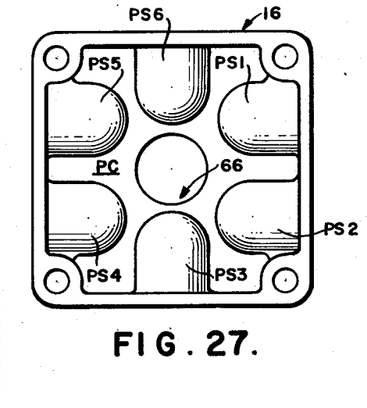

The signal pressure coupling gasket 20 is provided with signal pressure coupling ports P1–P6 corresponding, respectively, to the signal pressure transfer ports PS1'–PS6' in the input casing 16. A central bore 66' corresponding to the bore 66 in the input casing 16 carries the control pressure PC from the star-shaped central portion of the input casing.

The pressure transfer plate B15 includes a complete set of transfer channels T1–T6 and TC leading from the first sections of the signal pressure transfer ports PS1'–PS6' and the upper control pressure chamber PC in the plate B15, respectively, to the peripherally disposed extensions of the said signal and control pressure transfer ports PS1'–PS6' and PPC', respectively, located about the periphery of the pressure transfer plate B15 and all of the other pressure plates B1–B14 and diaphragms D1–D15. Thus, every part in the stack comprising the outer portion of the body 10 of the averaging relay of the invention carries every signal pressure as well as the control pressure, with the exception of the end caps 12 and 14 and the gasket 18. As shown in FIGURES 1, 2 and 3, the entire stack assembly of the body 10 is assembled via four longitudinal bolts 70 located one at each of the four corners of the plurality of elements in the said stack.

*Operation*

Referring now to FIGURES 3 and 4, the operation of the averaging relay of the present invention will now be described.

Signal pressure S1–S6 and S7 are admitted to the relay via signal inlet ports PS1–PS6 and PS7, respectively, located in the multiple inlet casing 16 and the bottom end cap 14. Subsequently, each of the signal pressures S1–S6, respectively, pass through the first portions of the transfer ports PS1'–PS6' in the input casing 16, coupling ports P1–P6 in the coupling gasket 20, first transfer channels T1–T6 and into the second portion of the transfer ports PS1'–PS6' from whence they are selectively coupled via the second set of signal pressure transfer channels TS1–TS6, located, respectively, into the various signal pressure chambers S1–S6 shown in FIGURE 3. The seventh signal pressure S7 is admitted to the relay via the inlet port PS7 in the bottom end cap 14, transfer port PS7' and transfer channel TS7 into the corresponding signal pressure chamber S7.

Since all of the signal pressure chambers S1–S7, by means of the odd numbered diaphragm buttons F13, F11, F9, F7, F5, F3, and F1, respectively, forming part of the lower chamber walls thereof, have a lower diaphragm area effectively greater than the upper diaphragm area therein, upon admitting the signal pressures S1–S7 to the averaging relay the spindle 30 is forced downward, closing the exhaust controlling portion 46 of the control valve 42 and opening the inlet portion 48 thereof to admit main pressure from the main pressure chamber PM into the lowermost control pressure chamber PC through the integral valve port and seat 44.

This action results in control pressure being admitted via the control pressure transfer port PPC' and the multiplicity of transfer channels TPC in the even numbered pressure plates B2–B12 and pressure plate B15 to all of the control pressure chambers PC in the body 10 of the averaging relay intermediate each pair of signal pressure chambers and above and below the upper and lower diaphragms D15 and D1, respectively.

Since the upper walls of the control pressure chambers PC between the ends of the stacked body portion of the spindle 30 are all made up in part by the even numbered diaphragm buttons F2, F4, F6, F8, F10 and F12, the upper diaphragm areas thereof are effectively greater than the lower thereby causing the action of the control pressure on the spindle 30 to act upward in opposition to the signal pressures.

The control valve 42 thus admits pressure from the main pressure chamber PM to the control pressure chambers PC until the control pressure in the said chambers PC is equal to the average value of all of the input signal pressures in the signal pressure chambers S1–S7. At this time the control valve 42 will close under the action of the first spider spring 50. The output of the relay is taken from the control pressure output port PPC to any suitable device adapted to be controlled thereby as a function of the average of a plurality of inputs.

If any one or more of the signal pressures should now decrease thereby lowering the average pressure of the input signal pressures, the value of the control pressure in the control pressure chambers PC will be greater than that reduced average input pressure and will force the spindle 30 upward moving the exhaust valve seat 36 away from the exhaust portion 46 of the control valve 42 to exhaust the control pressure to atmosphere via the lowermost control pressure chamber PC through the exhaust chamber PE and exhaust outlet port PE" in the pressure plate B14 for a period of time sufficient to reduce the control pressure and hence, the output pressure of the averaging relay at the control pressure outlet port PPC to the new average value of the input signal pressures. When this value is reached the forces on the spindle 30 is again balanced and the exhaust portion 46 of the control valve 42 is again seated on the exhaust seat 36.

Now, with the relay again in the balanced state, if one or more of the input signal pressures increase, these signal pressures in the signal pressure chambers S1–S7 will effect a higher average input creating a downward force from the differential in the signal pressure average and the presently lower value of control pressure in the control chambers PC, thus opening the inlet portion 48 of the control valve 42 to admit pressure from the main pressure chamber PM to the lowermost control pressure chamber PC until the control pressure therein is equal to the new average value of the multiple signal input pressures. The spindle 30 will be rebalanced at this point permitting the first spider spring 50 to close the input portion 48 of the control valve 42.

The action of the second or upper spider spring 56 and its upper mounting bolt 62 provides a means whereby a plus or minus pressure constant may be algebraically added to vary the neutral or zero operating point of the averaging relay. Thus, the control pressure may be made equal to the average input pressure plus or minus a given constant making the averaging relay more readily adaptable to various control requirements.

As can be seen from the foregoing specification and drawings, this invention provides a new and novel pneumatic relay for producing an output or control pressure as a function of the average value of a plurality of input signal pressures.

It is to be understood that the particular embodiment shown and described herein is for the purpose of example only and is not intended to limit the scope of the appended claims.

What is claimed is:

1. A pressure averaging relay for providing a modulated output pressure as a function of the average of a plurality of variable pressure inputs comprising a housing, a longitudinal central cavity within said housing, a plurality of parallel diaphragms dividing said cavity into a plurality of expansible chambers, the outermost of said chambers in said cavity and alternate ones of said plurality of chambers being interconnected and comprising control pressure chambers and the remaining chambers interdisposed with said alternate ones comprising pressure input chambers, first means in each of said pressure input chambers providing a greater effective diaphragm area on like sides thereof, second means in a like number of said control pressure chambers providing a greater effective diaphragm area on like sides thereof opposite to those in said pressure input chambers, whereby expansion of said pressure input chambers is in opposition to expansion of said control pressure chambers, said first and second means including interconnected means forming a spindle reciprocably mounted in said cavity on said diaphragms, exhaust means in said spindle connected with one of said outermost control pressure chambers, a source of supply pressure, and a relay valve in said one of said outermost control pressure chambers controlled by said spindle to selectively interconnect said source of supply pressure and said one of said control pressure chambers and alternatively interconnect said one of said control pressure chambers with said exhaust means, whereby in response to variations in any one or more of said pressure inputs, said control pressure is automatically varied by means of said spindle acting on said relay valve until said control pressure reaches a final value which produces an equal and opposite reaction on said spindle as from said plurality of pressure inputs, said final value of control pressure being a function of the average value of said plurality of pressure inputs.

2. The invention defined in claim 1, including means for selectively biasing said spindle with or against the action of said pressure inputs, whereby the operating level of the said control pressure may be selectively varied with respect to the average value of said pressure inputs.

3. The invention defined in claim 1, wherein said housing comprises a plurality of stacked pressure plates alternately interposed with said diaphragms, each of said plates including a central bore and counterbore defining said cavity in said housing with the said counterbores of adjacent plates oppositely disposed, a first plurality of pressure transfer channels located one in each of said plates wherein each of said plates carries all of said pressure inputs and said control pressure and a transfer channel in each of said plates selectively connecting a predetermined transfer port therein with an adjacent one of said expansible pressure chambers; a first end cap comprising a part of said other of said outermost control pressure chambers and including a plurality of inlet ports therein corresponding to a like plurality of pressure inputs; a pressure transfer plate including a second plurality of transfer channels extending respectively between corresponding pressure inlets in said end cap and pressure transfer ports in said pressure plates; and a second end cap forming one wall of said one of said outermost control pressure chambers including an inlet for said supply pressure, said relay valve, additional inlet means for said pressure inputs and an outlet port for said control pressure.

4. The invention defined in claim 3, wherein all of said pressure plates are of identical construction, said plates being invertably and rotatably positioned with respect to each other to provide the proper interconnections between said pressure transfer ports and said pressure chambers via said first transfer channels and the proper configurations to said pressure chambers.

5. The invention defined in claim 1, wherein said first and second means in said pressure input and control chambers, respectively, comprise first and second pluralities of diaphragm buttons, of stepped cross section, providing faces thereon parallel with one of said diaphragms in each of said chambers, said first and second buttons being oppositely stepped to thereby provide opposed equally effective diaphragm areas between adjacent pressure chambers.

6. In a modulating pressure relay including a main pressure source and a modulating valve and providing a modulated control pressure output, means acting on said modulating valve for modulating said control pressure as a function of the average of a plurality of variable input pressures comprising a control spindle for said modulating valve, a first like plurality of unidirectionally expansible chambers respectively receiving each of said input pressures and connected with said spindle for actuating said spindle in one direction of operation thereof, and a second like plurality of unidirectionally expansible chambers each receiving the said modulated control pressure and connected with said spindle in opposition to said first plurality of chambers for counterbalancing said spindle against the action of said input pressures whereby said control pressure is modulated as a function of the average value of said plurality of input pressures.

7. The invention defined in claim 6, wherein said first and second plurality of unidirectionally expansible chambers are alternately interposed, adjacent ones of said chambers having common opposed pressure walls.

8. The invention defined in claim 6, wherein said first and second plurality of chambers are alternately interposed and defined by a plurality of alternately stacked parallel diaphragms and spacers and wherein said chambers further include means for providing a greater effective diaphragm area on one side thereof, said diaphragm areas of said first plurality of chambers being, respectively, directly opposed to said diaphragm areas of said second plurality of chambers.

References Cited in the file of this patent
UNITED STATES PATENTS

| | | |
|---|---|---|
| 2,888,941 | Grogan | June 2, 1959 |
| 2,980,075 | Cunningham | Apr. 18, 1961 |
| 3,047,002 | Jaquith | July 31, 1962 |
| 3,059,846 | Vesper | Oct. 23, 1962 |